May 31, 1966 P. C. CURATOLA ET AL 3,253,612
VALVE HAVING AN ADJUSTABLE STOP
Filed July 30, 1963 2 Sheets-Sheet 1
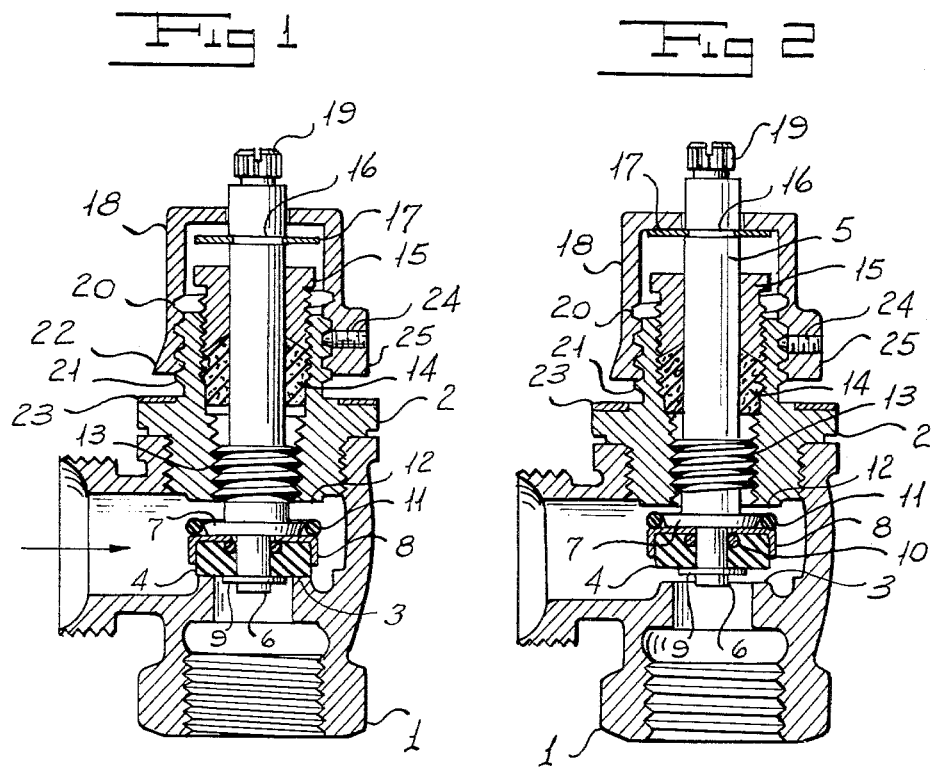
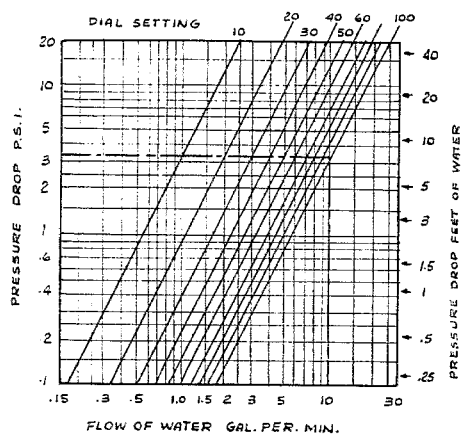
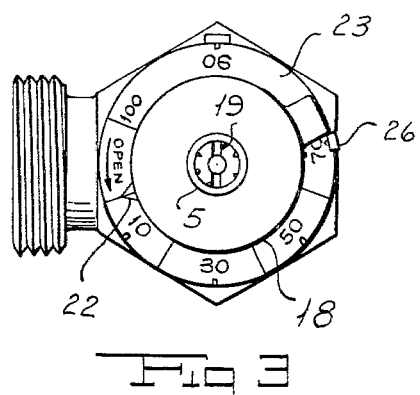
INVENTORS
Paul C. Curatola
John W. Ritter
Tibor R. Stevens
BY Cornelius Zabriskie
ATTORNEY

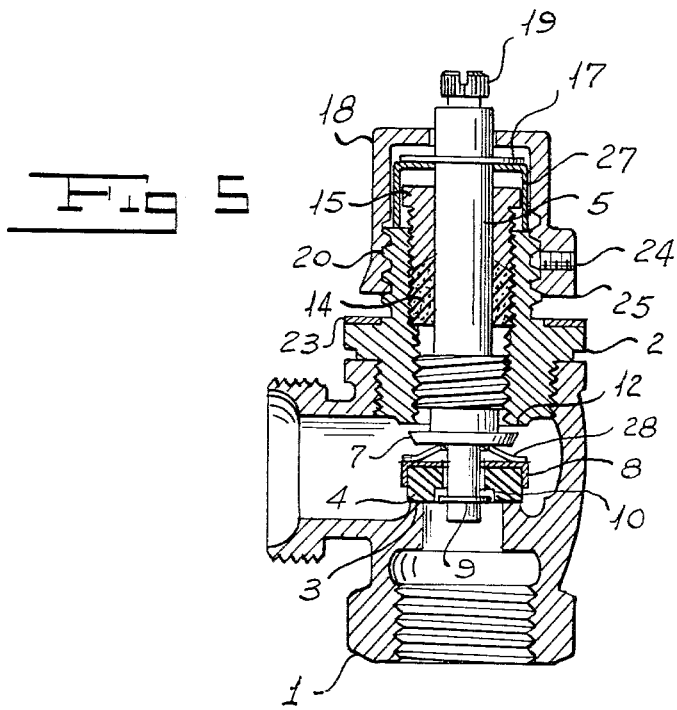
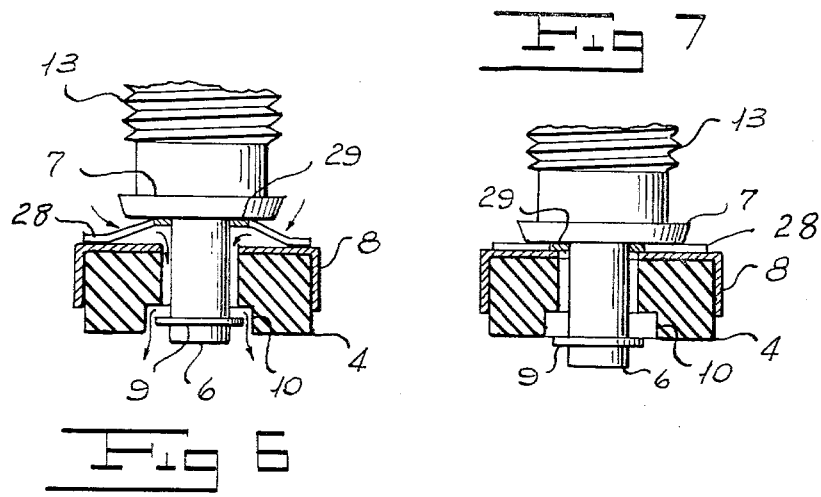

United States Patent Office 3,253,612
Patented May 31, 1966

3,253,612
VALVE HAVING AN ADJUSTABLE STOP
Paul C. Curatola, Bethlehem, and John W. Ritter, Emmaus, Pa., and Tibor R. Stevens, Jackson Heights, N.Y., assignors to Sarco Company, Inc., New York, N.Y., a corporation of New York
Filed July 30, 1963, Ser. No. 298,774
6 Claims. (Cl. 137—553)

This invention is for a balance valve, so called because it is particularly useful in systems embodying a plurality of valves which require balance or co-ordination in order that the system functions with the highest efficiency. It is to be understood, however, that the valve of this invention may be used alone in any particular appropriate environment without departing from the invention.

The objects of this invention are manifold. For example, one object is to so constitute a valve that it may be calibrated and set, at the time of manufacture, in an accurate and positive manner for subsequent balancing of a system without requiring a high degree of engineering or mechanical skill.

Another object of the invention is to provide a valve wherein the flow of fluid through the valve may be accurately controlled to effect a predetermined flow of fluid through the valve in gallons per minute at a corresponding pressure drop and under any predetermined setting of indicating means which may be depended upon to produce the desired percentage flow of fluid relative to the maximum flow of which such valve is capable.

Another object of the invention is to provide a valve which, under normal conditions, may be adjusted in the the manner described to permit a predetermined maximum fluid flow through the valve as well as complete sealing of the valve against such flow. Through the attainment of this object there will result a valve capable of complete shut off, in contradistinction to prior valves which provide for passage of fluid even when such valves are shut off to the maximum degree to which they are susceptible.

Another object of this invention is to provide a valve which may be employed to carry out the purposes of this invention either through such relationship of its parts as will permit of complete shut off of the flow or the passage, under substantially shut-off condition, of sufficient small amounts of the fluid as will preclude freezing of the valve when subjected to low temperatures. The advantage of this is that in either case, the valve may be completely sealed without disturbing its predetermined flow characteristics so that even after being completely sealed, the parts may be accurately returned to their original adjusted condition.

Another object of the invention is to provide a valve of the character described which will permit re-packing of the valve stem without shutting off the flow of fluid through the valve.

A further object of the invention is to provide a valve, which having been placed in adjusted condition, can be locked in such condition against unauthorized change in its initial factory calibration.

The foregoing objects are attained through the incorporation in the valve of numerous novel features which permit the use of the valve in wide fields of environment, such, for example, as in hot and cold water systems with fan coil units, induction units, convectors, radiators, fin-tube and baseboard radiation, unit heaters, unit ventilators, and a wide variety of other uses. Among these used is the employment of this invention in return mains of hot and chilled water systems, air heating coils using hot water, bypass lines of three-way diverting and mixing valves, as well as any process control with multiple units using hot or chilled water, as, e.g. in printing rolls, molds, platens, and the like.

The invention thus provides a practically universal valve to accurately and knowledgeably control the percentage of flow at any predetermined pressure drop, through the employment of a predetermined setting of visual indicating means which may be adjusted after it leaves the factory without the requirement of any mechanical or engineering skill.

Features of the invention, other than those adverted to, will be apparent from the hereinafter detailed description and appended claims, when read in conjunction with the accompanying drawings.

The accompanying drawings illustrate different practical embodiments of the invention, but the constructions therein shown are to be understood as illustrative, only, and not as defining the limits of the invention.

FIG. 1 is a diametric cross section of a valve embodying the present invention, so constituted that it can accurately produce a predetermined flow of gallons per minute and at the same time permit a complete shut off of such flow. This figure shows the valve in shut off position.

FIG. 2 is a view like FIG. 1, but showing the valve in partially open condition.

FIG. 3 is a plan view of the valve shown in FIG. 1.

FIG. 4 is a graph showing the characteristics of the valve of this invention and its operability to maintain a definite percentage of maximum flow of the liquid though the valve at a predetermined pressure drop and according to the setting of the indicating means shown best in FIG. 3.

FIG. 5 shows the same primary valve structure as illustrated in the previous figures, but having therein additional features which provide for such minimum flow as will preclude freezing of fluid within the valve when the valve is subjected to low temperatures.

FIG. 6 is an enlarged fragmental view of the minimum flow means illustrated in FIG. 5, and showing the path of minimum flow.

FIG. 7 is a view corresponding to FIGS. 5 and 6, but showing the complete sealing of the valve against even minimum flow when this is made possible by certain acts performed by an authorized person.

Referring first to FIGS. 1–4 of the drawings, 1 designates a valve housing comprising a bonnet 2. Within the housing and below the bonnet is a valve seat 3 and cooperable with said seat is a sealing member 4 mounted on a valve stem 5. The lower end portion of the valve stem is reduced as at 6 and above this reduced part is an inverted frusto conical flange 7 the under side of which forms a shoulder. An inverted cup 8 overlies the sealing member 4 and the cup and sealing member are secured to the valve stem in relative facial engagement by a split spring washer retainer 9, received within a circumferential groove in the reduced portion 6 of the valve stem. The upper face of the sealing element 4 is provided with a coaxial channel surrounding the reduced portion 6 of the valve stem and in this channel is seated an elastic O-ring 10 forming a leak-proof gasket about the passage through the sealing member.

Encircling the flange 7 is an elastic O-ring 11 adapted, when the sealing member is fully retracted from its seat, to bear against the surface 12 at the lower face of the bonnet 2. In this position, the O-ring 11 will form a seal against leakage at this point when the valve is fully open.

The valve stem is threaded as shown at 13 and cooperates with a coacting threaded portion in the bonnet. Above this threaded portion, the passage through the bonnet contains packing material 14 adapted to be compressed by a gland nut 15 threaded into the upper portion of the bonnet, so as to preclude leakage around the valve stem and through the threaded connection between the packing gland and the bonnet.

The valve stem 5 is provided above the gland nut 15 with a circumferential slot 16 in which is positioned a limiting split spring clip 17 adapted for cooperation with an abutment member 18, adjustable on the bonnet and cooperable with the spring clip 17 to thereby limit the opening movement of the sealing member 4 of the valve. This abutment member 18 may partake of different equivalent forms without departing from this invention, such, e.g., as a yoke of inverted cup shape adapted to house the limiting spring clip 17 which constitutes a limiting stop. The top of the yoke has a central opening through which the valve stem projects into accessible position. The valve stem may be slotted at 19 for operation by a screw driver or it may be equipped with an operating wheel handle (not shown), to permit the valve stem to be manually rotated for the purpose of raising and lowering the sealing member 4 relative to its seat.

The adjustable yoke 18 is provided with a relatively heavy internal thread 20 engaging with a like thread 21 formed on the exterior of the bonnet 2. The purpose of these threads is to vary the spacing between the limiting spring clip 17 and the underneath surface of the top wall of the balancing yoke for it will be apparent that, as the valve stem is rotated to raise the sealing member 4 from its seat, such travel cannot exceed that which will bring the limiting clip 17 into engagement with the yoke. Thus the degree to which the sealing member can be elevated from its seat will be dependent upon the elevation of the yoke 18 with respect to the bonnet 2.

The elevation of the yoke is adjusted by its rotation on the threads 21 of the bonnet 2. When the bonnet is rotated to elevate its top wall, the sealing member may be correspondingly raised and the flow through the valve increased. When the yoke is screwed downwardly, the extent to which the sealing member may be lifted from its seat is correspondingly decreased and the flow through the valve accordingly limited.

In accordance with the present invention, the yoke is provided with a pointer 22 adapted to cooperate with a graduated scale 23 fixedly supported on the bonnet below the pointer. The pitch of the threads 20 and 21 are so corelated with the position of the limiting spring clip 17 on the valve stem and the relation of the pointer to the scale 23 on the valve bonnet, that said scale and pointed are adapted to visually indicate the percentage of flow of fluid through the valve with respect to the maximum flow at fully open position of the valve. Consequently when the pointer registers with 100, as shown on the dial in FIG. 3, the valve will be at maximum opening. If the yoke 18 is rotated to the numeral 90 on the dial 23 as in FIG. 3, the flow through the valve will be 90% of the maximum flow of which the valve is susceptible, provided always that the predetermined pressure drop through the valve remains the same. Likewise the setting of the pointer on any of the other numeral designations on the dial will result in a corresponding percentage of flow when the pointer of the yoke is registering therewith.

The corelation of the parts as described is built into the valve and calibrated at the factory at the time of manufacture of the valve, so that properly authorized persons may thereafter readily adjust the bonnet to the percentage of maximum flow desired in order to balance any particular valve of this invention with other valves of like character which may be incorporated in the system. Thus all of the valves of such system may be brought into balanced relationship in order to produce maximum balance efficiency throughout the system.

In FIG. 3 the bonnet is in a position wherein the pointer 22 indicates that the valve is fully closed, a condition illustrated in FIG. 1. However, by moving the yoke counterclockwise as appears in this figure, the valve may be adjusted to the desired predetermined percentage of full maximum flow. After this adjustment has been made, an Allen screw 24, threaded through a boss 25 on the yoke, may be forced into engagement with the thread 21 of the bonnet to lock the parts in the desired adjusted position to give the flow desired. Thereafter, the valve cannot be tampered with, but will retain the adjustment in which it has been placed by an authorized person. Nevertheless the valve may be freely closed as shown in FIG. 1 or it may be opened to adjusted position wherein the limiting spring clip 17 engages the top wall of the yoke, which position corresponds to the retained adjustment at which the parts have been set by an authorized person. FIG. 2 shows the valve in opened adjusted condition.

As shown in FIG. 3, an upstanding tongue 26 carried by the dial lies in the path of the boss 25, so as to normally limit the rotation of the yoke from zero or fully closed position to fully opened position indicated at 100.

If at any time it is desired to repack this valve, an authorized person may do so by first temporarily bending the tongue 26 out of the path of the boss 25. The Allen screw is then loosened and the yoke 18 removed. The limiting spring clip 17 is then removed and the valve stem retracted to bring the gasket 11 into engagement with the surface 12 of the bonnet to form a seal about the valve stem independently of the packing 14. The gland nut 15 may then be removed along with the packing 14 and the valve repacked without attendant leakage.

However, in the normal operation of the parts, with them in the position shown in FIGS. 1 and 2, the valve may be fully closed at any time to permit repair of some part of the system or some adjunct connected to the downstream side of the valve without leakage through the valve during the operation. However, as soon as it is completed, the valve may be opened to its preadjusted position at which time the limiting spring clip 17 will be engaged with the bonnet to leave the valve in its pre-set balance condition. Consequently, this valve may be fully closed or opened to its pre-set condition without disturbing the balanced setting of the valve.

An important advantage of the present invention appears in the graph of FIG. 4. In this graph, suppose, for example, that a flow of 10 gallons per minute is desired with a pressure drop of 3.5 p.s.i. The dot and dash lines shown in this figure indicate the factors involved in the valve setting, for it will be here noted that the dot and dash lines corresponding to these predetermined factors will intersect at a dial setting of 100. When the pointer is set at 100, these conditions will result.

Now suppose the flow of exactly 1 gallon per minute with a pressure drop of .4 p.s.i. is desired, the dial setting would be 30.

Thus, the mere setting of the yoke with respect to the dial will automatically produce the desired flow of gallons per minute for this particular pressure drop per square inch. Likewise other desired flows per minute with other pressure drops per square inch can be immediately determined by an authorized person in setting the yoke to produce the balance condition desired.

It will of course be understood in this connection that other valves in the system would be correspondingly adjusted and their yokes locked in position to fix a balanced condition throughout the system, after which valves may be opened and closed within the range of these settings by any unskilled persons without disturbing the balanced condition described.

The valve of FIGS. 5–7 embodies the same fundamental elements as the valve shown in FIGS. 1–3 with the addition of two mechanical elements 27 and 28, the former of which is a minimum flow member and the latter of which is a spring washer which keeps the sealing member from rotating or chattering. These additional elements are associated with the fundamental elements of the valve in the following manner. The minimum flow member 27 is in the form of an inverted cup which rests upon the upper edge of the bonnet, beneath the spring clip limiting stop 17, so as to normally limit the closing movement of the sealing member of the valve.

In the construction of FIGS. 5–7, the sealing member 4 is inverted from its position shown in FIGS. 1 and 2 so that the channel 10 thereof is at the under side of the sealing member and houses the split spring retainer washer 9. The spring washer 28 is interposed between the part 8 and the shoulder at the bottom of the flange 7. This spring washer is in the form of a spider, the central portion 29 of which embraces the reduced portion 6 of the valve stem, as shown in FIG. 6, while the resilient radial arms bear upon the part 8 and through their resiliency hold the sealing member 4 to the valve seat 3 when the valve stem has been screwed down to engage the minimum flow member 27. The valve may thus be said to be closed, as shown in FIGS. 5 and 6, because the sealing member 4 is in engagement wtih its seal. Nevertheless slight flow or flow bleeding does occur, as indicated by the arrows in FIG. 6 to preclude freezing of the fluid in the valve under freezing conditions.

If at any time complete sealing of this valve is desired, the Allen screw 24 may be loosened by an authorized person to free the yoke 18 for rotation. The yoke 18 may then be removed, along with the limiting clip 17, so that the minimum flow member 27 may be removed. The parts 17 and 18 may then be replaced and the valve stem screwed down to flatten out the spider-like spring 28, so that the parts take the position shown in FIG. 7, wherein the valve is completely sealed to permit, e.g., removal of some part of the system beyond the valve without concurrent leakage.

In other respects and for the purpose of adjustment and calibration, the valve as shown in FIGS. 5 and 7 will function as a balancing valve as hereinbefore described in connection with FIGS. 1 and 2. If desired, the O-ring 11 shown in the latter figures may be employed in the valve of FIG. 5, although it may be omitted as shown without departing from this invention.

The foregoing detailed description sets forth the invention in its preferred practical forms, but the invention is to be understood as fully commensurate with the appended claims.

Having thus fully described the invention, what we claim as new and desire to secure by Letters Patent is:

1. A valve comprising: a housing having therein a valve seat, a sealing member cooperable with said seat and having a valve stem for moving the sealing member to and from the seat, a yoke adjustable relative to and engageable by a stop on the valve stem, said yoke being in the form of an inverted cup through the end closure of which the valve stem passes, the skirt of which yoke is internally threaded and engages cooperating threads on the valve housing for rotatably adjusting the axial spacing between the valve seat and end closure the yoke, said stop comprising an annular element secured to the valve stem between the sealing member and the yoke, said yoke and stop cooperating to form an adjustable limit of valve opening movement, said housing and yoke having indicating means comprising a graduated dial on one of them and a pointer on the other, said indicating means indicating the percentage of maximum flow obtainable at the adjusted limit of valve opening.

2. A valve as claimed in claim 1 wherein means are provided to positively lock the yoke in its adjusted position.

3. A valve according to claim 1, comprising an O-ring gasket surrounding the valve stem and interposed between the sealing member and the superjacent portion of the housing to engage with the latter when the valve is in fully opened position to preclude leakage about the valve stem.

4. A valve according to claim 1, wherein the valve stem is provided with a shoulder with the sealing member interposed between said shoulder and the valve seat, said sealing member having a coaxial channel in one of its faces and an O-ring gasket seated in said channel and embracing the vlave stem to preclude leakage between the valve stem and the sealing member.

5. A valve comprising: a housing having therein a valve seat, a movable valve stem having a valve sealing member thereon, and a yoke having a threaded connection with the housing and cooperable with a stop on the valve stem to effect an adjustable limit for opening movement of the valve stem, and a removable minimum flow member in the form of an inverted cup through which the valve stem passes, said minimum flow member being provided between the housing and the stop on the valve stem such that said stop engages the minimum flow member to limit the closing movement of the valve.

6. The valve as claimed in claim 5 wherein said valve stem is provided with a shoulder and a retained for retaining the sealing member on the valve stem between said retainer and the shoulder, and a perforate spring washer interposed between said shoulder and said sealing member for resiliently forcing the sealing member to the valve seat upon closure of the valve, there being sufficient clearance between the valve stem and the sealing member to permit bleeding of the fluid through said washer and said clearance when said sealing member is seated, said washer being adapted to seal said clearance by mens of the additional closing movement of the valve stem afforded by removal of the minimum flow member.

References Cited by the Examiner

UNITED STATES PATENTS

| | | | |
|---|---|---|---|
| 401,647 | 4/1889 | Foster | 137—630.15 |
| 941,316 | 11/1909 | Frishmuth | 251—330 X |
| 1,165,026 | 12/1915 | Schreidt | 137—553 |
| 1,287,698 | 12/1918 | Kiley | 137—553 |
| 1,446,710 | 2/1923 | Loescher et al. | 251—285 |
| 1,552,159 | 9/1925 | Holter | 251—285 |
| 1,991,052 | 2/1935 | Derby | 251—285 X |
| 2,109,801 | 3/1938 | Parker | 251—330 X |
| 2,934,307 | 4/1960 | Henderson | 251—330 X |
| 2,977,087 | 3/1961 | Lindgren et al. | 251—285 X |
| 2,977,981 | 4/1961 | Jarrett | 251—285 X |
| 3,105,519 | 10/1963 | Fraser | 251—285 X |
| 3,107,082 | 10/1963 | Reynolds | 251—284 X |

FOREIGN PATENTS 763,105   12/1956   Great Britain.

M. CARY NELSON, *Primary Examiner.*

HENRY T. KINKSIEK, *Examiner.*